US006823970B2

(12) United States Patent
Hayes et al.

(10) Patent No.: US 6,823,970 B2
(45) Date of Patent: Nov. 30, 2004

(54) BRAKE DRUM PILOT AND METHOD OF MANUFACTURING SAME

(75) Inventors: Brian D. Hayes, Newark, OH (US); Robert J. Martin, III, Newark, OH (US); Tomaz Dopico Varela, Gahanna, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/417,840

(22) Filed: Apr. 17, 2003

(65) Prior Publication Data

US 2004/0206586 A1 Oct. 21, 2004

(51) Int. Cl.[7] ............................................. I16D 65/10
(52) U.S. Cl. ................................. 188/218 R; 403/274
(58) Field of Search ....................... 188/218 R, 218 XL; 403/1, 284, 289, 282

(56) References Cited

U.S. PATENT DOCUMENTS 5,898,997 A * 5/1999 Meeker et al. ......... 29/894.362
6,604,794 B1 * 8/2003 Messina .................... 301/6.6
6,626,581 B2 * 9/2003 Uchman ..................... 384/544

* cited by examiner

Primary Examiner—Matthew C. Graham
(74) Attorney, Agent, or Firm—Carlson, Gaskey & Olds, PC

(57) ABSTRACT

A brake assembly is provided including a hub assembly having a barrel portion and a flange extending radially outwardly from the barrel portion. The flange includes an outer circumference, and a plurality of studs are arranged circumferentially about the flange inboard of the outer circumference. A brake drum includes a generally annular mounting portion includes a plurality of mounting holes spaced circumferentially thereabout with the plurality of studs disposed within the plurality of mounting holes. A brake drum pilot surface engages the outer circumference of the hub flange and includes a plurality of relief pockets aligned with the plurality of studs. The studs generate a deformed area in the outer circumference of the hub flange aligned with the stud. The deformed areas are received in the relief pockets so that deformation of the outer circumference of the hub flange does not interfere with properly piloting of the brake drum onto the hub assembly.

18 Claims, 2 Drawing Sheets

BRAKE DRUM PILOT AND METHOD OF MANUFACTURING SAME

BACKGROUND OF THE INVENTION

This invention relates to a brake assembly, and more particularly, the invention relates to a method and apparatus of piloting a brake drum onto a hub assembly.

A brake drum is mounted onto a hub assembly for receiving a braking force applied to the brake drum by brake shoes. The brake drum must be properly positioned relative to the hub assembly, which is commonly referred to as piloting, so that the axis of the brake drum is concentric with the axis of the hub assembly and the drum and hub assembly are fully seated against one another. Ensuring concentricity between the brake drum and hub assembly is critical in order to prevent a catastrophic failure resulting from vibrations induced by a misaligned brake drum. For one type of brake assembly configuration, the large central opening of the brake drum is piloted on the barrel portion of the hub assembly to align the brake drum with the hub assembly. In another type of configuration typically used in transit bus applications, the brake drum is piloted on the outer circumference of the hub flange, which includes the studs used to secure the brake drum to the hub assembly. The brake drum pilot includes a pilot surface that extends circumferentially 360° along an inner face of the annular mounting portion of the brake drum, which defines the central opening.

The outer circumference of the hub flange must have a relatively tight tolerance for cylindricity since the pilot surface engages the outer circumference to locate the brake drum relative to the hub assembly. If the diameter of the hub flange is too large in any area, then the drum will not seat properly and the drum and hub assembly may not be concentric. The studs are pressed into holes in the hub flange and may result in the outer circumference of the flange deforming the flange so it is enlarged in areas. As a result, the brake drum may not properly pilot onto the hub flange so that the brake drum is not concentric with the hub assembly and/or the mounting portion of the brake drum is not seated flush against the face of the hub flange, which may generate vibrations resulting in a catastrophic failure. To this end, the outer circumference of the hub flange is machined after the studs are pressed into the flange. However, when the hubs are serviced in the field with new studs, the flange may swell again deforming the outer circumference of the hub flange so that it is enlarged. Therefore, what is needed is a drum pilot and method that ensures that the brake drum properly pilots onto the hub assembly without requiring costly machining operations.

SUMMARY OF THE INVENTION AND ADVANTAGES

The present invention provides a brake assembly including a hub assembly having a barrel portion and a flange extending radially outwardly from the barrel portion. The flange includes an outer circumference, and a plurality of studs are arranged circumferentially about the flange extending axially there from inboard of the outer circumference. A brake drum includes a generally annular mounting portion and includes a plurality of mounting holes spaced circumferentially thereabout with the plurality of studs disposed within the plurality of mounting holes. A generally cylindrical brake flange extends axially from the mounting portion in a direction away from the barrel portion. A pilot extends axially from the mounting portion in the same direction as the cylindrical brake flange. The pilot is arranged circumferentially about the mounting portion and defines a pilot surface engaging the outer circumference of the hub flange. The pilot includes a plurality of relief pockets aligned with the plurality of studs interrupting the pilot surface such that the pilot surfaces are spaced from one another. Installation of the studs into the hub flange generates a deformed area in the outer circumference of the hub flange that is generally aligned with the stud. The deformed areas are received in the relief pockets so that deformation of the outer circumference of the hub flange does not interfere with properly piloting of the brake drum onto the hub assembly.

Accordingly, the above provides a drum pilot and method that ensures that the brake drum properly pilots onto the hub assembly without requiring costly machining operations.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
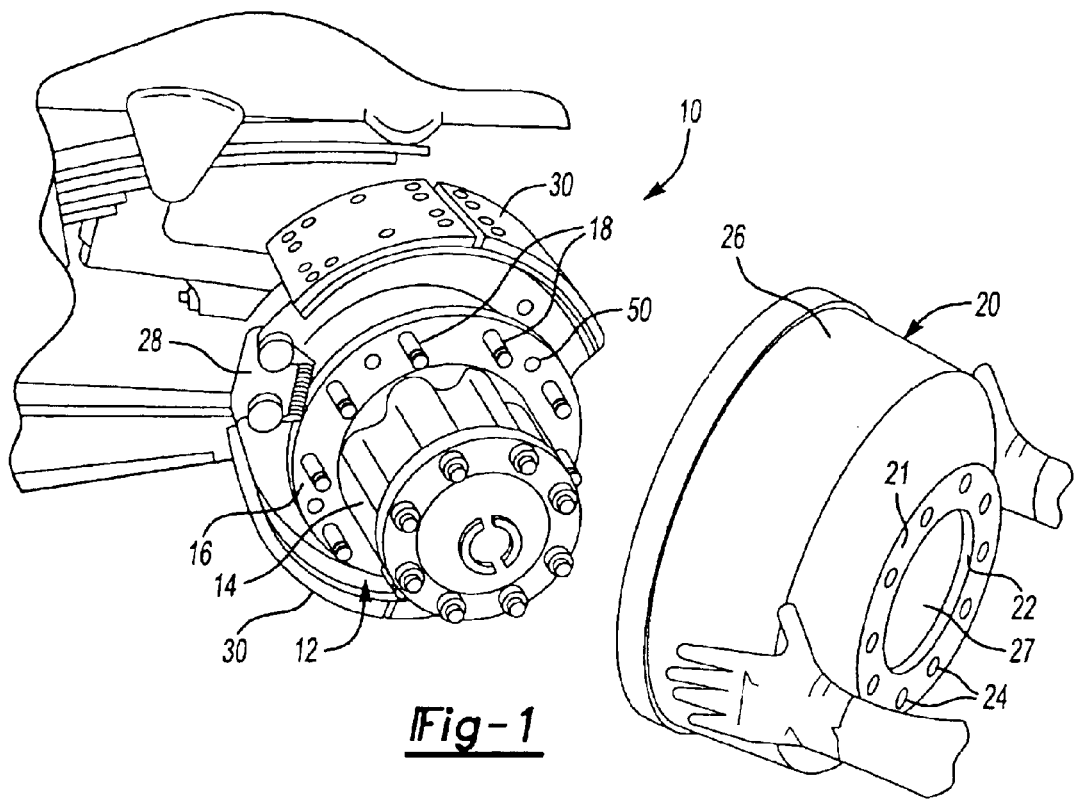
FIG. 1 is a perspective view of a brake drum being installed onto a hub assembly.

A brake assembly 10 shown in FIG. 1 is typically used in transit bus applications. The brake assembly 10 includes a hub assembly 12 having a barrel portion 14 and a hub flange 16 extending radially outwardly from the barrel portion 14. The hub flange 16 includes a plurality of studs 18 arranged circumferentially thereabout. A drum 20 includes a central opening 22 that receives the barrel portion 14 when the drum is secured to the hub assembly 12. The drum 20 includes a mounting portion 21 having a plurality of holes 24 for receiving the studs 18. The drum 20 includes a cylindrical brake flange 26 extending axially in a direction opposite of the barrel portion 14. The brake assembly 10 includes a brake spider 28, as is known in the art, supporting opposing brake shoes 30 that engage a braking surface 27 of the brake flange 26 when the vehicle brakes are actuated by the operator.

Figure 2:
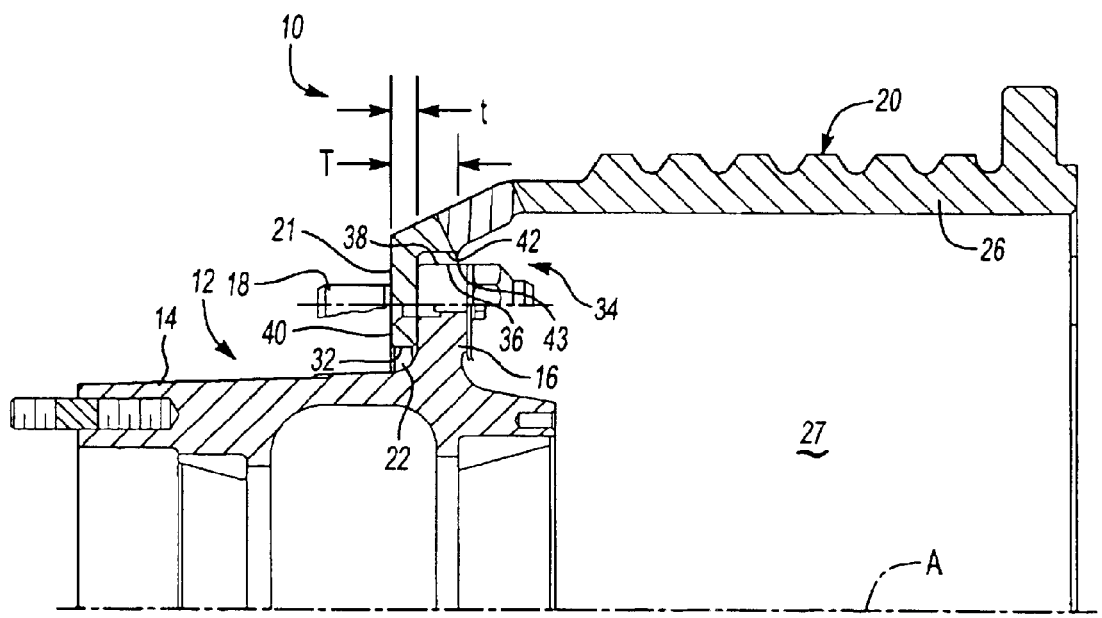
FIG. 2 is a cross-sectional view of the present invention brake drum installed onto a hub assembly.

Referring to FIGS. 1 and 2, the central opening 22 defines an inner circumference 32 that is spaced from the barrel portion 14 when the drum 20 is installed onto the hub assembly 12. That is, the central opening 22 is not used to pilot the drum 20 onto the hub assembly 12 as is the case in other types of configurations. Said another way, the central opening 22 does not engage the barrel portion 14 to align the drum 20 relative to the hub assembly 12 to obtain concentricity between the drum 20 and hub assembly 12. Rather, the present invention utilizes a pilot 34 on the mounting portion 21 adjacent to the brake flange 26. The pilot 34 includes a pilot surface 36 that engages an outer circumference 38 of the hub flange 16. The pilot surface 36 ensures that the drum 20 is aligned with the hub assembly 12 in a desirable manner. Specifically, the pilot surface 36 ensures that the drum 20 is concentric with the hub assembly 12 along a common axis A, and that the inner face of the mounting portion 21 is flush with the outer face of the hub flange 16 so that the drum 20 fully seats against the hub flange 16. In this manner, the pilot surface 36 prevents vibration of the drum 20 due to misalignments that may otherwise result in a catastrophic failure of the brake assembly 10.

The mounting portion 21 may include holes 48 (FIG. 3) for receiving retaining fasteners that secure the drum 20 to the hub assembly 12 by being threadingly received in threaded apertures 50.

As discussed above, cylindricity or roundness of the outer circumference 38 is necessary to ensure that the drum 20 properly pilots onto the hub flange 16. Installation of the studs 18 may generate a deformed area of the outer circumference 38 that enlarges the diameter of the outer circumference 38 making the outer circumference 38 out of round and too large to be received by the pilot 34. An out of round or enlarged outer circumference 38 may make it difficult if not impossible to properly pilot the drum 20 onto the hub flange 16. As a result, the prior art required machining of the outer circumference 38 potentially after every stud installation. The present invention incorporates relief pockets 42, best shown in FIGS. 3 and 4, that interrupt the pilot surface 36. The relief pockets 42 provide recesses that accommodate the deformed areas of the outer circumference 38 after the studs have been pressed into the hub flange 16.

Referring to FIG. 2, the mounting portion 21 may have a first thickness t indicative of the thickness of the mounting portion 21 from the outer face 40 to the inner face that is seated against the hub flange 16. The pilot 34 may have a second thickness T that is larger than the first thickness t. The thickness T is indicative of the thickness from the outer face 40 to an edge 43 of the pilot surface 36. The relief pocket 42 provides a recess in the second thickness T that may extend to a depth that is the difference between the second thickness T and the first thickness t. Of course, the relief pockets 42 may be described in other terms and still fall within the scope of the inventions.

Figure 3:
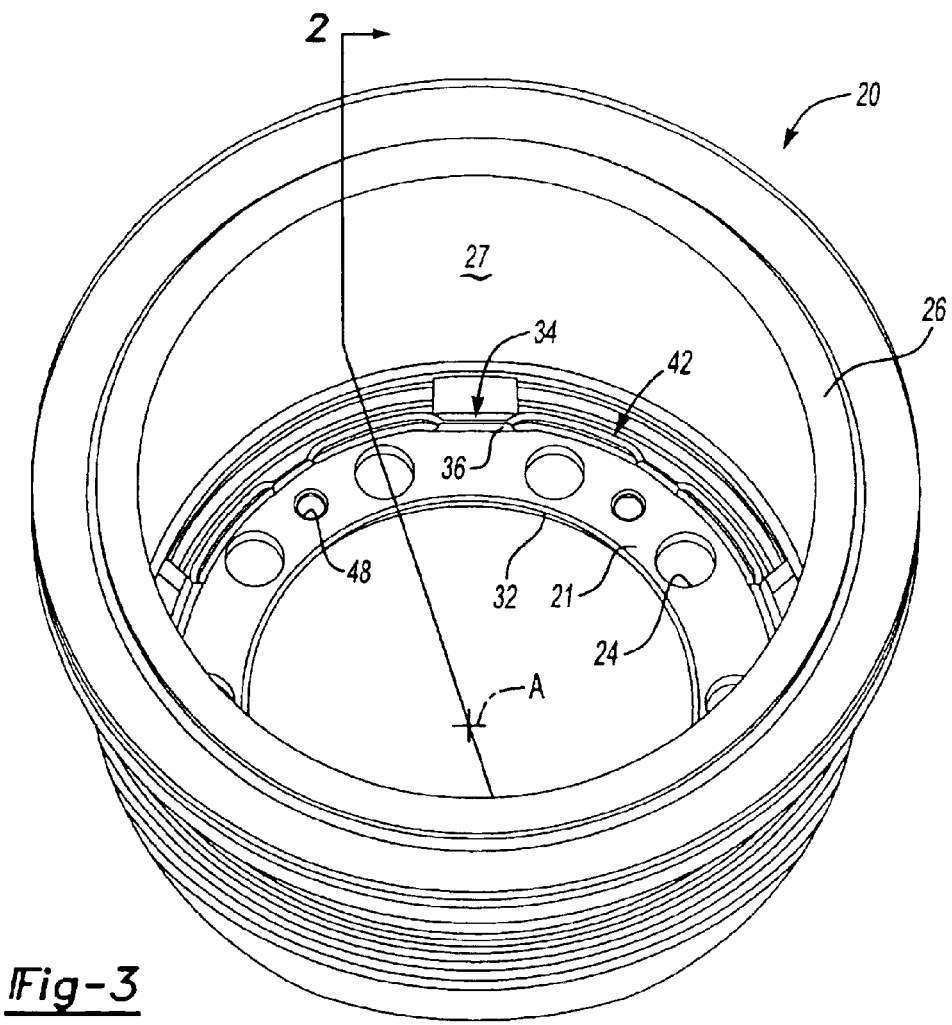
FIG. 3 is a rear perspective view of the present invention brake drum shown in FIG. 2.
Figure 4:
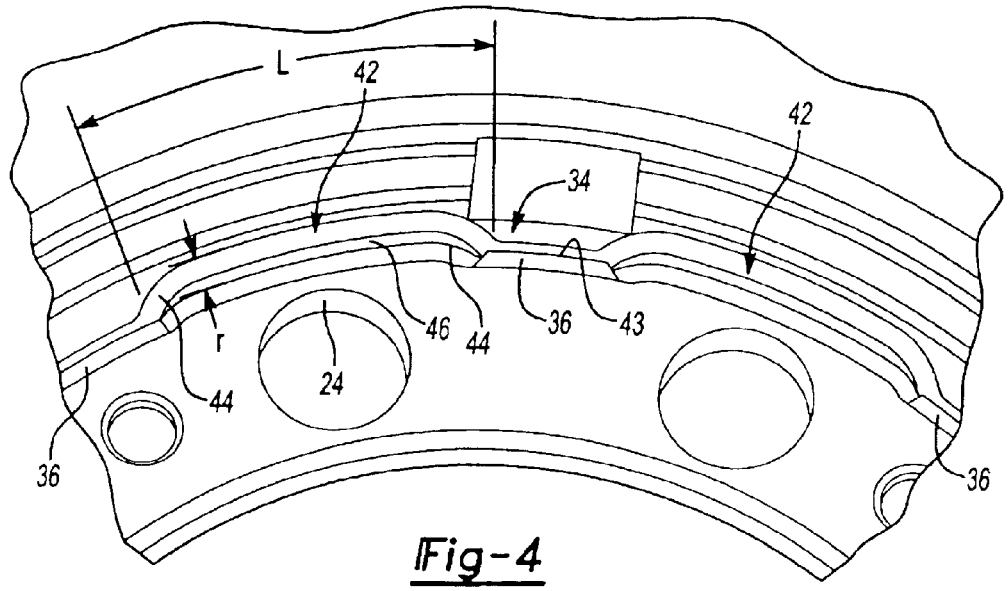
FIG. 4 is an enlarged perspective view of the pilot shown in FIG. 3.

Referring to FIGS. 3 and 4, the relief pockets 42 are of at least a sufficient size to accommodate the deformed area of the outer circumference 38. There may be an individual relief pocket 42 for each of the holes 24 with a pilot surface 36 arranged between each of the relief pockets, as shown in FIGS. 3 and 4, or the relief pockets may extend annularly about more than one hole 24 so that a pilot surface 36 is not arranged between each of the holes 24. Reducing the number of pilot surfaces 36 ensures that the drum 20 will properly pilot onto the hub flange 16 in the presence of rust and other debris on the hub flange 16.

As shown in FIG. 4, the relief pocket 42 extends an arcuate length L sufficient to accommodate the length of the deformed area of the outer circumference 38. The relief pocket 42 extends radially outwardly relative to the pilot surface 36 a radial distance r sufficient to accommodate the deformed area. The dimensions of the relief pockets 42 may be determined by finite element analysis or empirically. The relief pockets 42 may be of any suitable geometry. For example, the relief pockets 42 may include opposing curved portions 44 with a generally flat or slightly curved portion 46 adjoining the curved portions 44.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A brake drum comprising:
   a generally annular mounting portion defining a central opening, said mounting portion including a plurality of mounting holes spaced circumferentially thereabout and spaced radially outwardly from said central opening, and said mounting portion having a first axial thickness with said mounting holes arranged in said first axial thickness;
   a generally cylindrical brake flange extending axially from said mounting portion in a direction; and
   a pilot axially extending from said mounting portion in said direction and adjacent to said brake flange, said pilot arranged circumferentially about said mounting portion, said pilot defining a pilot surface, said pilot having a second axial thickness greater than said first axial thickness, and said pilot including a plurality of relief pockets aligned with said plurality of mounting holes, said plurality of relief pockets interrupting said pilot surface.

2. The brake drum according to claim 1, wherein said relief pockets have a thickness that is equal to a difference between said first and second axial thicknesses.

3. The brake drum according to claim 2, wherein said first axial thickness is a distance between an outer face and an inner face of said mounting portion, and said axial thickness is defined by a distance from said outer face and an edge of said pilot surface.

4. A brake drum according to claim 1, wherein said relief pockets are spaced radially outwardly a distance from said pilot surface.

5. A brake drum according to claim 1, wherein a portion of said pilot surface is arranged circumferentially between each of said mounting holes.

6. A brake drum according to claim 1, wherein said relief pockets are defined by opposing curved portions and a generally flat portion joining said opposing curved portions.

7. A brake assembly comprising:
   a brake hub assembly having a barrel portion and a flange extending radially outwardly from said barrel portion, said flange including an outer circumference and a plurality of studs arranged circumferentially about said flange inboard of said outer circumference, said studs extending axially from said flange in a direction of said barrel portion;
   a brake drum having a generally annular mounting portion defining a central opening with said barrel portion disposed within said central opening, said central opening including an inner circumference spaced from said barrel portion, said mounting portion including a plurality of mounting holes spaced circumferentially thereabout with said plurality of studs disposed within said plurality of mounting holes; and
   said brake drum including a pilot axially extending from said mounting portion in a direction opposite said direction of said barrel portion, said pilot arranged circumferentially about said mounting portion, said pilot defining a pilot surface engaging said outer circumference, and said pilot including a plurality of relief pockets aligned with said plurality of studs, the relief pockets interrupting said pilot surface.

8. The brake assembly according to claim 7, wherein at least one of said studs generates a deformed area in said outer circumference, with said deformed area received in one of said relief pockets.

9. The brake assembly according to claim 8, wherein said deformed area is spaced from said pilot.

10. The brake assembly according to claim 8, wherein said pilot surface is arranged circumferentially outboard of said deformed area.

11. The brake assembly according to claim 8, wherein said relief pockets include an arcuate length with said deformed area having a length less than said arcuate length.

12. The brake assembly according to claim 8, wherein said relief pockets extend a radial distance from said pilot surface with said pilot spaced radially outwardly from said deformed area.

13. The brake assembly according to claim 7, wherein said pilot surface includes portions arranged between said mounting holes.

14. A method of installing a brake drum into a brake assembly comprising the steps of:
   a) providing a brake drum with a generally annular mounting portion and a generally cylindrical brake flange extending axially from the mounting portion;
   b) providing a pilot arranged circumferentially on the mounting portion having a pilot surface with a plurality of relief pockets interrupting the pilot surface;
   c) providing a plurality of mounting holes in the mounting portion aligned with the plurality of relief pockets;
   d) providing a hub assembly having an annular flange with an outer circumference and a plurality of circumferentially arranged studs; and
   e) installing the brake drum onto the hub assembly with the pilot surface engaging the outer circumference and the plurality of relief pockets aligned with the plurality of studs.

15. The method according to claim 14, wherein step c) includes providing the pilot surface between the mounting holes.

16. The method according to claim 14, wherein step d) includes the studs generating a deformed area.

17. The method according to claim 16, wherein step d) includes installing the studs subsequent to machining the outer circumference.

18. The method according to claim 17, wherein step e) includes installing the brake drum onto the hub assembly subsequent to stud installation without machining the outer circumference between stud installation and brake drum installation.

* * * * *